United States Patent [19]

Kunert et al.

[11] Patent Number: 4,684,571

[45] Date of Patent: * Aug. 4, 1987

[54] LIGHT DIFFUSING INSULATING GLASS ELEMENT

[75] Inventors: Heinz Kunert, Cologne; Hermann-Wolf Jbach, Remscheid, both of Fed. Rep. of Germany

[73] Assignees: Vegla Vereinigte Glaswerke GmbH, Aachen; JMC Acrylguss GmbH & Co., Remscheid, both of Fed. Rep. of Germany

[*] Notice: The portion of the term of this patent subsequent to Nov. 4, 2003 has been disclaimed.

[21] Appl. No.: 773,124

[22] Filed: Sep. 6, 1985

[30] Foreign Application Priority Data

Sep. 6, 1984 [DE] Fed. Rep. of Germany ....... 3432761

[51] Int. Cl.$^4$ .......................... B32B 3/26; B32B 7/12
[52] U.S. Cl. ............................ 428/314.8; 428/317.7; 428/319.1; 428/332; 428/337; 428/339; 428/441; 428/442
[58] Field of Search ............... 428/314.4, 314.8, 317.1, 428/317.7, 319.1, 332, 337, 441, 442, 339

[56] References Cited

U.S. PATENT DOCUMENTS

| | | | |
|---|---|---|---|
| 2,205,534 | 6/1940 | Lytle | 428/319.7 |
| 3,160,925 | 12/1964 | Gort | 428/319.1 |
| 3,177,109 | 4/1965 | Ziegler | 428/319.1 |
| 3,440,130 | 4/1969 | Telkes | 428/319.1 |
| 3,471,356 | 10/1969 | Kolb et al. | 428/319.1 |
| 4,046,951 | 9/1977 | Stefanik | 428/412 |

FOREIGN PATENT DOCUMENTS

| | | |
|---|---|---|
| 0030246 | 1/1983 | European Pat. Off. . |
| 1073164 | 1/1960 | Fed. Rep. of Germany . |
| 1264023 | 3/1968 | Fed. Rep. of Germany . |
| 2055822 | 5/1972 | Fed. Rep. of Germany . |
| 2326747 | 12/1974 | Fed. Rep. of Germany . |
| 1542454 | 9/1968 | France . |
| 386087 | 4/1965 | Switzerland . |
| 562171 | 5/1975 | Switzerland . |

OTHER PUBLICATIONS

Jmacryl Foam brochure, JMC Acrylguss GmbH & Co. KG, Remscheid (no date), 12 pages.

Primary Examiner—William J. Van Balen
Attorney, Agent, or Firm—Marmorek, Guttman & Rubenstein

[57] ABSTRACT

A light diffusing, insulating glass element is disclosed comprising two thin silicate glass panels (1, 2) each about 2 mm thick, and a thick intermediary layer (3) about 15 to 20 mm thick. The intermediary layer (3) is made from a foamed-up acrylate glass having closed bubbles. This layer has a specific weight of approximately 20 to 30 kg/m$^3$ and a light transmissivity of 60 to 80% for a layer thickness of 20 mm. A shatterproofing splinter-bonding transparent layer (5) is located between one of the glass panels (1, 2) and the intermediary layer (3) and is bonded to them. The other glass panel is bonded to the intermediary layer (3) by means of a thin adhesive coat.

The insulating glass element is light and, because of its safety-glass properties, is particularly well suited for ceiling use.

21 Claims, 6 Drawing Figures

LIGHT DIFFUSING INSULATING GLASS ELEMENT

BACKGROUND OF THE INVENTION

This invention relates to a light diffusing, insulating glass element having two silicate outer glass panels and an intermediate layer made from a light-transmissive, foam-like plastic material.

Insulation glass panels of this nature are known in the prior art. For example, in German patent document No. DE-AS 1 073 164 an insulating glass panel of this kind is disclosed. In that case, the light diffusing intermediate panel is a thin plastic foam layer, about 1 to 2 mm thick, the role of which is to produce diffused light, even under direct sun illumination. In such known insulation glass elements, the foam layer is placed loosely between the silicate glass panels which are connected to each other by an adhesive and insulating edge connection. These known insulation glass panels suffer from certain deficiencies, such as that they possess insufficient heat insulation properties. Also, they are not suited for placement in ceiling glass enclosures because, in case of breakage, falling glass slivers can lead to injury.

Another insulation glass panel of similar construction is described in German Gebrauchsmüster document GM No. 7 315 974. This known insulation glass panel is characterized in that the light-diffusing intermediate layer consists of a plate made of parallel layered hollow threads of glass or plastic which are arranged at right angles to the glass surfaces. In addition, between this intermediate layer and at least one of the adjoining glass panels, a layer made of glass fibers is inserted. In this known insulation glass panel, the individual layers are also laid together loosely, and the glass panels are connected to each other merely at the edges. This known insulation glass panel therefore has the same disadvantages as the previously mentioned prior art insulation glass panel.

SUMMARY OF THE INVENTION

It is an object of the present invention to provide an insulation glass element of the aforementioned type such that while the known advantages of such a glass element are maintained, i.e. it provides good heat insulating properties and good light diffusion, the disadvantages, e.g. the risks of injury in case of breakage of the glass element, are reduced.

This and other objects are achieved by means of the present invention which provides a light diffusing insulation glass element comprising two outer silicate glass panels, a light transmissive foam-like plastic layer between the outer silicate glass panels, and a light transmissive shatterproofing plastic layer bonded to the inner side of at least one of the outer glass panels.

As a consequence of the shatterproofing, i.e. splinter-bonding plastic layer being glued to the outer glass panels, any glass splinters and broken pieces which are produced when a glass element breaks, are retained. The glass element thereby acts in a manner similar to a safety-glass panel.

According to one preferred embodiment, the foam-like intermediate layer itself can serve as the shatterproof plastic layer. In this case, the plate-shaped foam layer is glued directly to one or the other, or to both, outer glass panels by means of an appropriate adhesive or solvent. When the foam plate is made of a thermoplastic material, it may be sufficient to heat the silicate glass panels to an appropriate temperature and to press the layers together.

According too another preferred embodiment, the light transmissive, splinter or fragment bonding plastic layer is an additional plastic layer, glued to the glass panel. This additional shatterproofing layer can also be glued to the foam panel on its side facing the foam panel. Alternatively, the shatterproofing plastic layer can also be placed loosely against the foam panel, without being glued to it, if the two outer silicate glass panels are held together at their edges by some other means.

In one particularly practical embodiment of the invention, the foam-like intermediate layer is made from a foamed-up acrylic with closed bubbles, having a specific weight of 20 to 30 kg/m$^3$ and a light transmissivity of approximately 80% for a panel thickness of 16 mm, while the silicate glass panels are very thin glass panels, about 2 mm thick, which are glued to the foam panel. A particularly useful foam-like intermediate layer of a foamed-up acrylic glass is available in the market under the trademark IMACRYL FOAM, a product of the German company IMC Acrylguss GmbH & Co. KG. Such an insulation glass element not only has excellent light diffusion and insulation properties, but additionally weighs very little, e.g., only about 12 kg/m$^2$. Furthermore, this glass insulation element has particularly good mechanical resistance properties, because the silicate glass panels, when they are that thin, possess high elasticity, and this elasticity is fully retained when they are combined with the above mentioned foam material. For this reason, such insulation glass units are suitable for applications where units with thicker glass panels cannot be used because of their low bearing capacity. They are especially suitable for overhead glazing, as well as for other applications where safety considerations have until now made wire-reinforced glass or compound safety glass mandatory.

Thermoplastics can be used as the splinter-bonding plastic layer, such as they are used for making laminated safety glass, and which are bound to the silicate glass panels through application of heat and pressure. In their stead, it is also possible to use liquid synthetic resins which harden as they cure, to coat the glass panel before applying the light-diffusing intermediate layer. To effect application of the adhesive layer or the shatterproofing plastic layer, known methods can be used, such as spraying, pouring, etc.

BRIEF DESCRIPTION OF THE DRAWINGS

Examples of preferred embodiments of the invention are disclosed in greater detail below and in the drawings. The drawings show the following.

DETAILED DESCRIPTION OF THE PREFERRED EMBODIMENTS

Figure 1:
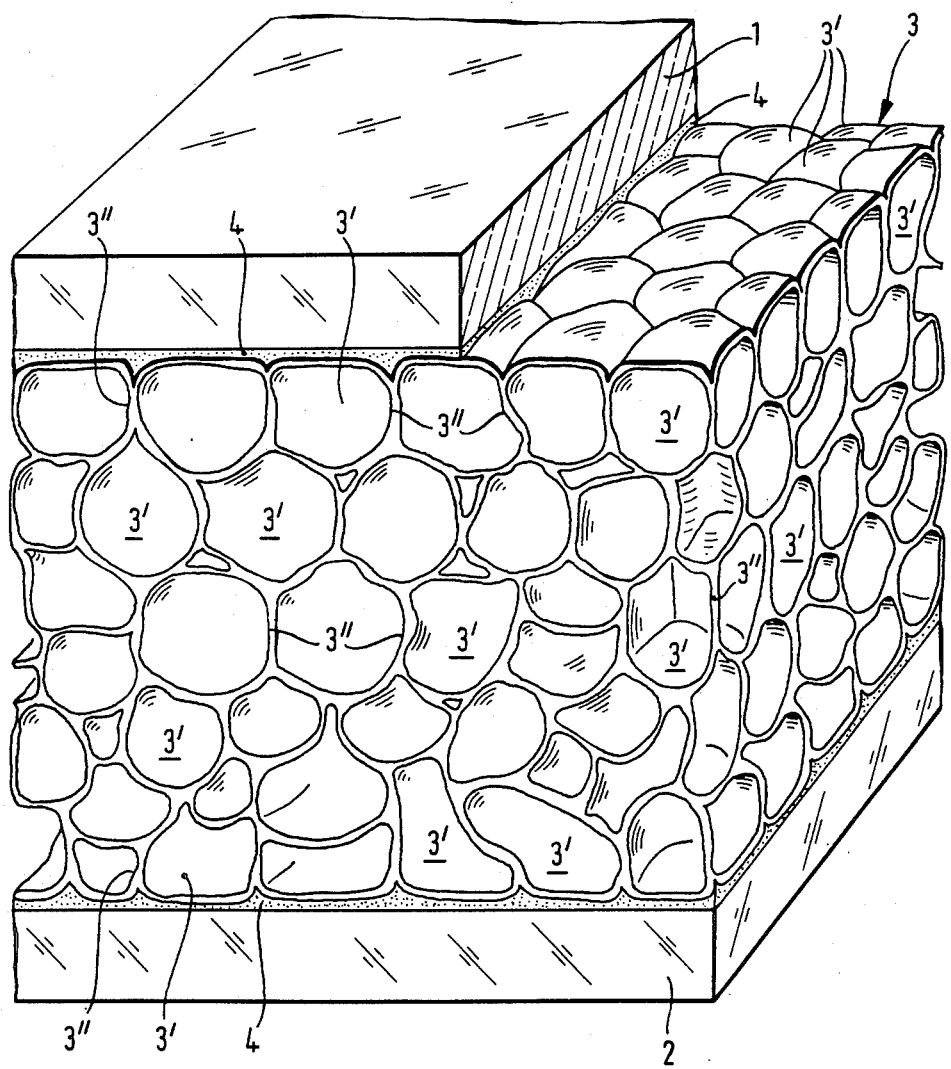
FIG. 1 shows a perspective view of a light diffusing insulation glass element of the present invention having a symmetric design in which the foam layer itself serves also as the shatterproof or splinter-bonding layer.

Referring to the drawings, a light diffusing glass element of the present invention comprises outer silicate glass panels, 1 and 2, and an intermediate layer 3 made from a light transmissive foam. The foam is comprised of closed bubbles 3' having walls 3''. An adhesive coating 4 is also present to glue the glass panels to a light transmissive, shatterproof plastic layer, which in the case of the embodiment shown in FIG. 1, also comprises intermediate foam layer 3.

Common to all of the illustrated embodiments, is the fact that the silicate glass panels 1 and 2 which form the cover panels of the insulation glass unit are made of very thin flat glass with a thickness of only 1 to 3 mm, but preferably 1.5 to 2 mm, and that the intermediate layer 3 consists of a light transmissive plastic foam, specifically an acrylic foam, with closed, relatively large bubbles 3'. The bubbles 3 of the acrylic foam measure approx. 3 to 8 mm in diameter, with the preferred diameter being approx. 4 to 6 mm. The walls 3'' of the bubbles 3' are extraordinarily thin, having a thickness of approx. 30 to 80 microns. Acrylic foams of this kind, depending upon the size of the bubbles, have a specific weight of about 20 to 30 kg/m$^3$. A foam panel of this type with a thickness of 16 mm for example, has a weight of approx. 0.4 to 0.5 kg/m$^2$. Since the silicate glass panels 1 and 2, because of their thinness, also weigh only about 5 kg/m$^2$, the complete insulation glass unit weighs only approx. 11 to 12 kg/m$^2$ and therefore weighs less than a monolithic glass panel with a thickness of 5 mm, for instance. At the same time, however, the insulation glass element of the present invention possesses incomparably higher heat insulating properties, as well as the advantageous properties of safety glass. Thereby, new applications are possible for the insulation glass unit of the present invention, such as were reserved for other transparent building elements in the past.

The intermediate layer 3 can have a thickness from about 10 to 40 mm, depending on the degree of heat insulation desired for the insulation glass panel. For most applications, foam-like intermediate layers with a thickness of approx. 15 to 20 mm will suffice.

Figure 2:
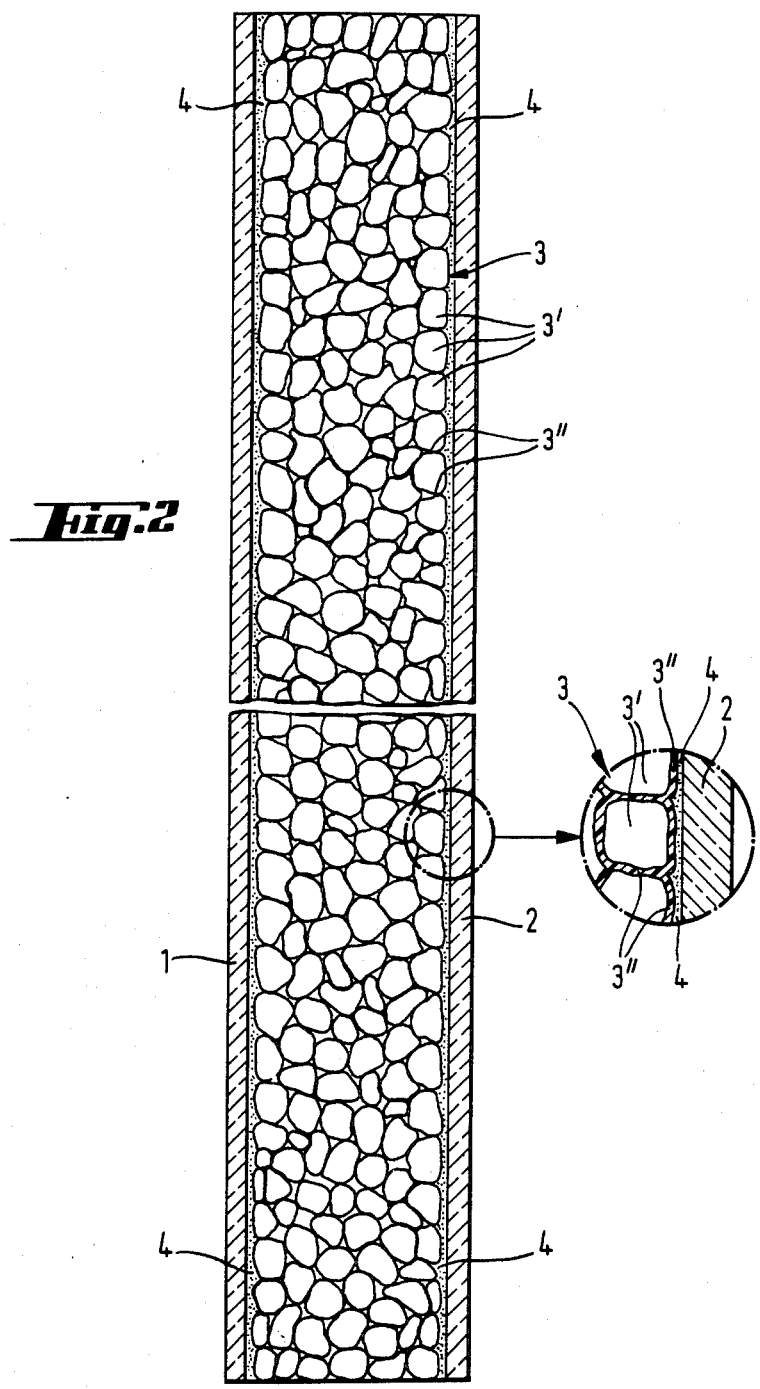
FIG. 2 shows a cross-sectional view of the embodiment of the new insulation glass element illustrated in FIG. 1.

In the insulation glass unit illustrated in FIGS. 1 and 2, the two silicate glass panels 1 and 2 are directly bound to the foam-like intermediate acrylic glass layer 3 along their entire surfaces. Binding is effected by means of adhesive coating 4. Adhesive coating 4 can be chosen from a number of known and commonly used adhesives suitable for glueing silicate glass to acrylic foam. It is desirable to use solvent-free adhesives, in particular, transparent thermoplastic adhesives or transparent double-component polyurethane adhesives. The adhesives are applied in a thin coating to the inside surfaces of glass panels 1 and 2, for example, by means of pouring or spraying. Through application of pressure and, if required, heat, the coated glass panels 1 and 2 are joined to the intermediate layer 3.

Particularly useful as adhesive for this purpose are ultraviolet-hardening acrylic compositions such as described in the pending German patent application No. P 3523140 of June 28, 1985, not yet published. These compositions consist of a monomer component A, a polymer component B and a photoinitiator component C, the component A consisting of a mixture of at least (A$_1$): an $\alpha,\beta$-unsaturated carboxylic acid, and
(A$_2$): at least one monofunctional $\alpha,\beta$-unsaturated carboxylic acid ester of an alcohol containing 2 to 10 carbon-atoms and which may optionally contain oxygen atoms in the form of ether and/or hydroxylic groups, and the component B consisting of a polymer entirely or preponderantly consisting of polyvinyl chloride, which can be additionally chlorinated.

Figure 3:
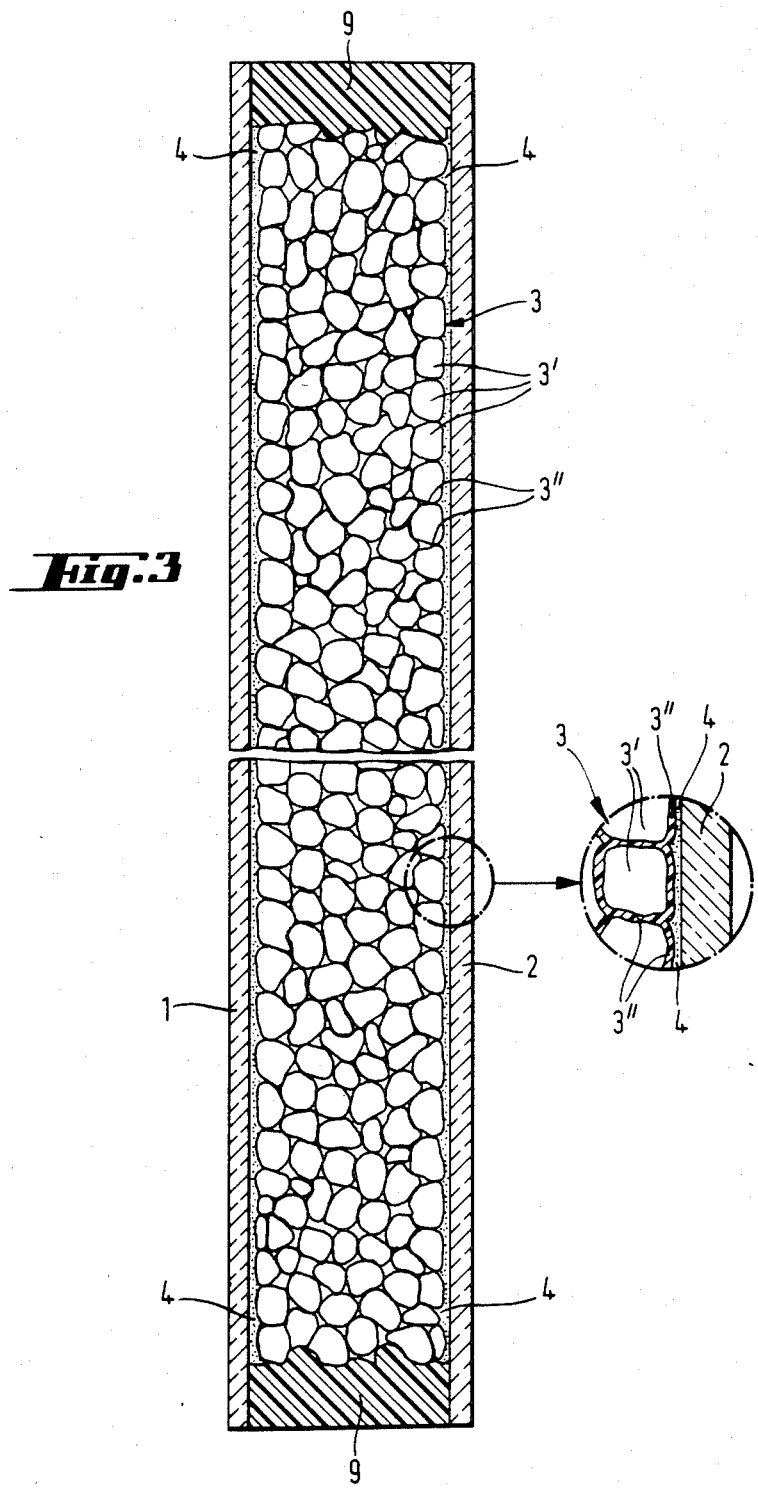
FIG. 3 shows an embodiment similar to that illustrated in FIGS. 1 and 2, but with an all-around edge seal.

The insulation glass element illustrated in FIG. 3 is essentially of the same construction as the one illustrated in FIGS. 1 and 2, i.e., it is made up of silicate glass panels 1 and 2 which adhere to the intermediate layer 3 by means of the adhesive coating 4. However, in this embodiment, intermediate layer 3 is not entirely coextensive, but is smaller than the glass panels 1 and 2. Thereby, a groove is formed at the edges circumscribing the glass unit. This groove is filled with a water-and-vapor-proof sealing mass 9. Such edge sealing may be highly advantageous for certain applications.

Figure 4:
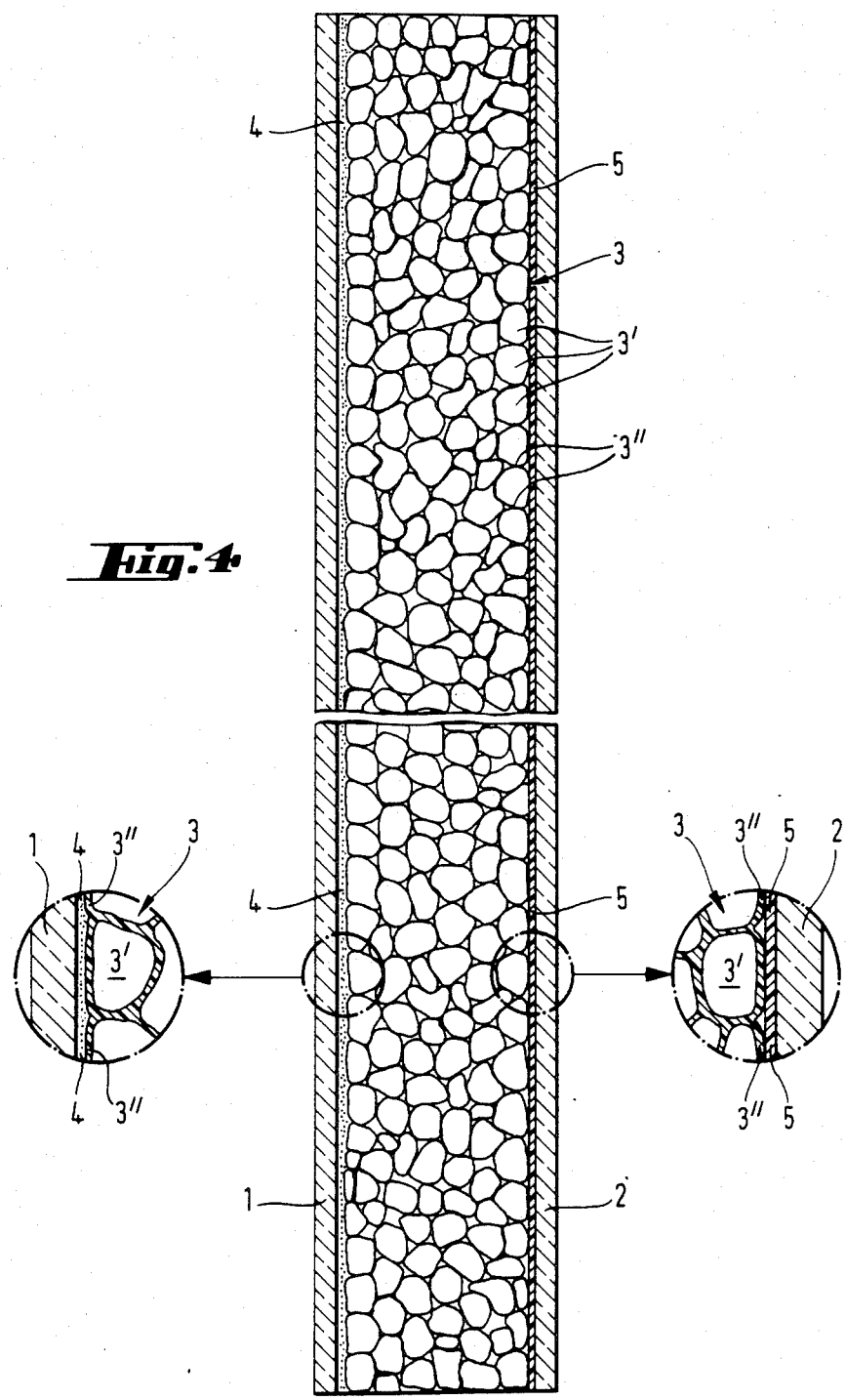
FIG. 4 shows an embodiment having an asymmetrical design, in which an additional, shatterproof plastic layer is placed against one of the outer glass panels.

The insulation glass unit illustrated in FIG. 4 also includes two outer panels 1 and 2, made of silicate glass approx. 2 mm thick, and an intermediate acrylic foam layer 3 approx. 20 mm thick. The silicate glass panel 1 is again joined directly to the intermediate layer 3 by means of a thin adhesive coating 4. The silicate glass panel 2, however, is bound to layer 5 which assumes the shatterproofing function of the glass unit. This plastic layer 5 may comprise a double-component reacting resin, for example, a transparent double-component polyurethane casting resin which, when cured, possesses the shatterproofing properties. The plastic layer 5 can also take the form of a thermoplastic sheet laid on glass panel 2 and attached to it by application of heat and pressure. In addition to glass panel 2, the plastic layer 5 is also glued to the intermediate layer 3, so that the individual layers 1 to 5 are all glued together in a sandwich fashion over their entire surface.

Figure 5:
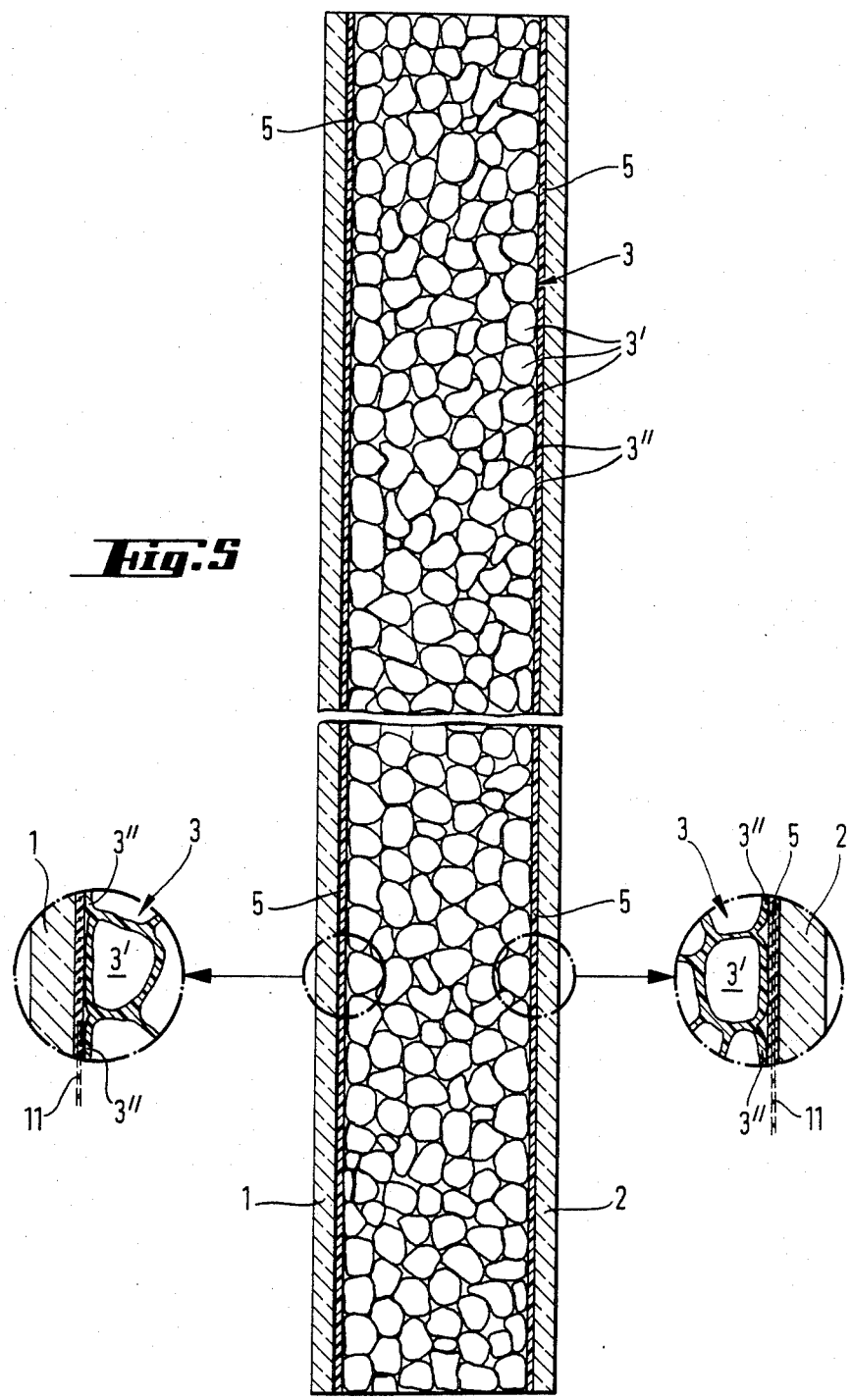
FIG. 5 shows yet another embodiment of symmetrical design, in which each of the outer glass panels is equipped with an additional, shatterproof plastic layer.

FIG. 5 shows an insulation glass unit in which glass panel 2 as well as glass panel 1 are bonded on their inner surfaces to a separate shatterproofing plastic layer 5. Otherwise, this insulation glass unit is constructed as the insulation glass units described previously, in that the individual layers 1, 2, 3 and 5 are glued together over their entire surfaces. In the present instance, a wide-meshed net 11, made of a textile weave or of spun glass fibers can optionally be inserted within plastic layers, whereby shatterproofing is improved even further in certain instances while a good optical and light diffusing effect is obtained.

As in all the other examples described above, special sealing at the edges of the unit is not necessary, as any water condensation or vapor that might enter the unit would not affect the transparency of the intermediate layer 3. Depending upon the ambient temperature and humidity, such vapor entering the unit through the edges will leave it again by the same way.

Figure 6:
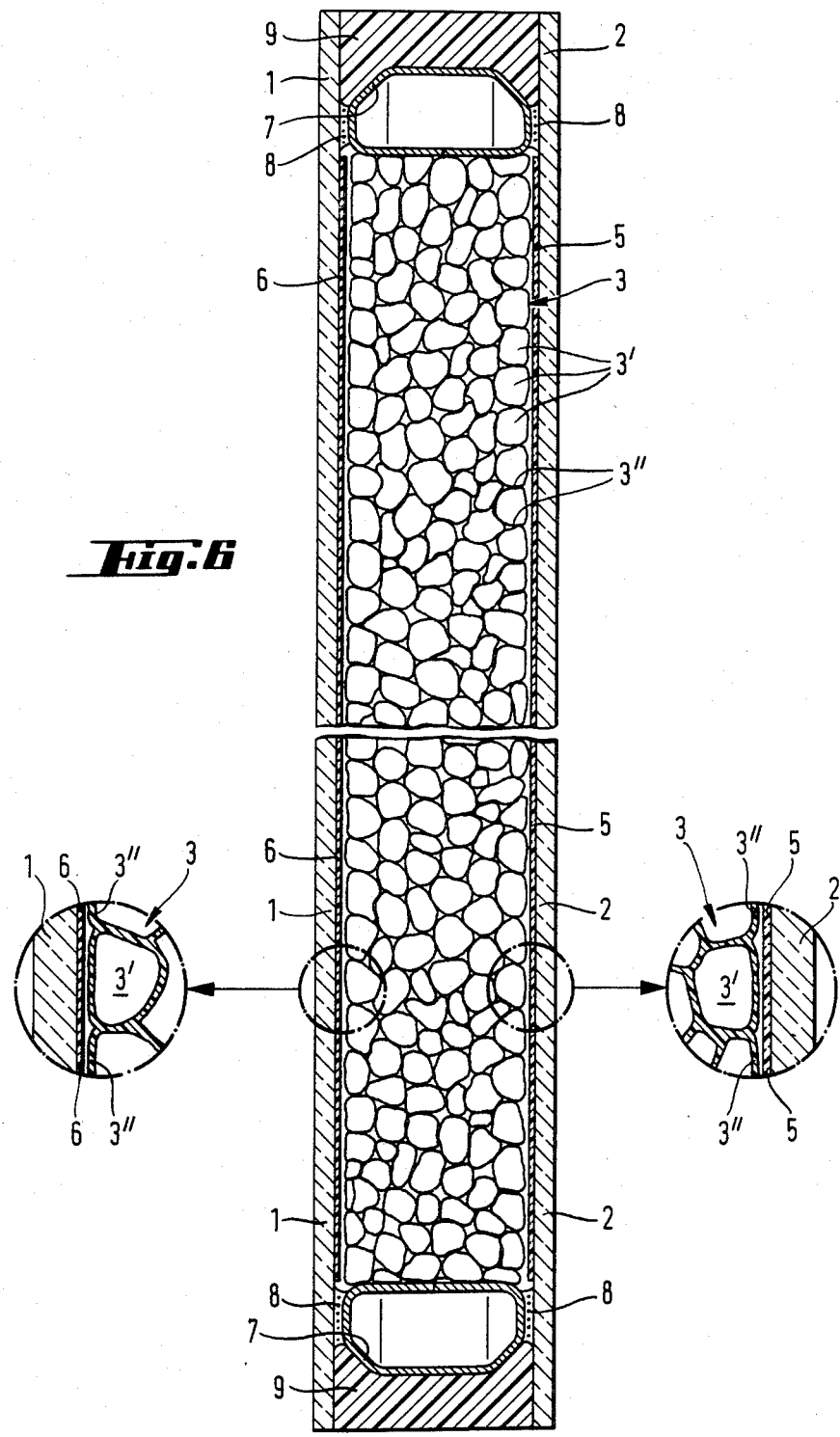
FIG. 6 shows an embodiment of the new insulation glass element in which the outer glass panels are attached to each other over a spreader frame.

The insulation glass unit shown in FIG. 6 again comprises two thin silicate glass panels 1 and 2, of approx. 2 mm thickness each, and a foam-like intermediate layer 3 of acrylic glass foam, approx. 16 mm thick. Here too, a shatterproofing plastic layer 5 is glued to the silicate glass panel 2. Silicate glass panel 1 is coated on its inside surface with a heat-ray reflecting coating 6. Between the two glass panels 1 and 2, respectively glued to the plastic layer 5 and to the reflecting coating 6, a foam-like intermediate layer 3 is inserted loosely, i.e. without adhesive attachment. To hold glass panels 1 and 2 together, a metal spreader frame 7 around the edges is used. An adhesive coating 8, between spreader frame 7 and the edges of the glass panel, and a sealant mass 9 in the groove between the glass panel edges and spreader frame 7 are also employed. Plastic layer 5 and, if applicable, also reflective layer 6 extend as far as spreader frame 7. Such an insulation glass unit, with a heat-ray reflecting coating, is then installed in such manner as to place the heat reflecting coating 6 on the outside and the shatterproofing layers on the inside of the building. In order to further improve the shatterproof qualities of any one of the embodiments of the invention, and/or when very thin adhesive coatings are used, a wide-meshed net, web or netting, made of textile or glass fibers, for example, a net made of thin nylon or perlon threads, can be employed and can be made to adhere to the glass surface by means of the adhesive, such as has already been described in connection with FIG. 5. Instead of the foam layer 3, it would also be possible in certain circumstances to use a layer made of a light material with similar properties. For example, panels made of hollow threads, arranged in parallel layers which are at a right angle to the panel surfaces, or capillary tubes made of a transparent plastic, known as such, can be used.

While the invention has been described by reference to specific embodiments, this was for purposes of illustration only and should not be construed to limit the spirit or the scope of the invention.

We claim:

1. A light diffusing glass insulation element, comprising
   a pair of outer silicate glass panels,
   a light transmissive intermediate layer disposed between said glass panels, said intermediate layer being made from an acrylic foam, said intermediate layer being substantially greater in thickness than said glass panels, and
   an adhesive layer binding at least one of said glass panels to said intermediate layer, said adhesive layer being made from a solvent free, ultraviolet-light curing acrylic adhesive material, wherein said intermediate layer and said adhesive layer impart shatterproofing properties to said glass element.

2. The glass element of claim 1 comprising an adhesive layer located between each of said glass panels and said intermediate layer.

3. The glass element of claim 1 wherein each of said glass panels has a thickness of about 1 to 3 mm.

4. The glass element of claim 1 wherein said intermediate layer has a thickness of about 10–40 mm.

5. The glass element of claim 1, wherein said intermediate layer has a thickness of about 15 to 20 mm.

6. The glass element of claim 1 wherein said acrylic foam comprises closed cells having a wall thickness of about 30 to 80 microns, said cells having a diameter of about 3 to 8 mm.

7. The glass element of claim 1, wherein said acrylic foam has a specific weight of about 20 to 30 $kg/m^3$ and a light transmissivity of about 60 to 80% for a foam layer thickness of 20 mm.

8. The glass element of claim 1, wherein said acrylic adhesive material is an ultraviolet-curing acrylic composition comprising a monomeric component A, a polymeric component B, and a photoinitiator component C, wherein
   said monomeric component A comprises a mixture of at least an $\alpha,\beta$-unsaturated carboxylic acid and at least one monofunctional $\alpha,\beta$-unsaturated carboxylic acid ester of an alcohol containing 2 to 10 carbon atoms, and
   said polymeric component B comprises a polymer substantially comprising polyvinyl chloride.

9. The glass element of claim 8, wherein said $\alpha,\beta$-unsaturated carboxylic acid ester contains oxygen atoms in the form of ether groups.

10. The glass element of claim 8, wherein said $\alpha,\beta$-unsaturated carboxylic acid ester contains oxygen atoms in the form of hydroxyl groups.

11. The glass element of claim 8, wherein said polymeric component B is additionally chlorinated.

12. The glass element of claim 1 wherein said pair of glass panels are joined to each other along their edges.

13. The glass element of claim 1 wherein said intermediate layer has a smaller surface area than said pair of glass panels and a peripheral groove is formed about the edge of said intermediate layer, and wherein said glass element further comprises an edge sealing mass inserted into said groove.

14. The glass element of claim 13, wherein said glass element further comprises a spreader frame disposed within said groove 1-between said edge sealing mass and said intermediate layer.

15. The glass element of claim 1, further comprising a shatterproofing plastic layer disposed between said intermediate layer and at least one of said glass panels.

16. The glass element of claim 15, further comprising a wide-meshed net made from tear-resistant textile fibers, said wide-meshed net being integral with said plastic layer.

17. The glass element of claim 15, wherein said plastic layer is made from a double-component reacting resin.

18. The glass element of claim 15, wherein said plastic layer is made from a thermoplastic material which is bound to at least one of said outer glass panels by applying heat.

19. The glass element of claim 6, wherein said plastic layer is made from a thermoplastic material which is bound to at least one of said outer glass panels by applying heat and pressure.

20. The glass element of claim 1 further comprising a heat-ray reflective coating located on the inside surface of at least one of said glass panels.

21. The glass element of claim 1 further comprising a plastic foil having a heat-ray reflective coating located on the inside surface of at least one of said glass panels.

* * * * *